(12) United States Patent
Pierre

(10) Patent No.: US 10,836,571 B2
(45) Date of Patent: *Nov. 17, 2020

(54) TRASH RECEPTACLE FOR SEPARATING LIQUIDS AND SOLIDS

(71) Applicant: Mark Antony Pierre, Granite Bay, CA (US)

(72) Inventor: Mark Antony Pierre, Granite Bay, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,873

(22) Filed: Sep. 13, 2019

(65) Prior Publication Data

US 2020/0002089 A1 Jan. 2, 2020

Related U.S. Application Data

(63) Continuation-in-part of application No. 15/894,232, filed on Feb. 12, 2018, now Pat. No. 10,414,582.

(60) Provisional application No. 62/458,431, filed on Feb. 13, 2017, provisional application No. 62/516,287, filed on Jun. 7, 2017.

(51) Int. Cl.
*B65F 1/00* (2006.01)
*B65F 1/16* (2006.01)

(52) U.S. Cl.
CPC .................. *B65F 1/0033* (2013.01)

(58) Field of Classification Search
CPC ...... B65F 1/0033; B65F 1/006; B65F 1/1607; B65F 2210/132

USPC ........................................................... 4/625
See application file for complete search history.

(56) References Cited

U.S. PATENT DOCUMENTS

| | | | |
|---|---|---|---|
| 4,019,896 A | 4/1977 | Appleby | |
| 4,538,512 A | 9/1985 | Blough | |
| 5,172,630 A | 12/1992 | Thompson | |
| 6,443,057 B1 | 9/2002 | Gazzoli | |
| 8,544,673 B1 | 10/2013 | Polk | |
| 9,003,967 B2 | 4/2015 | Reed | |
| 10,196,203 B2 | 2/2019 | Standke | |
| 10,414,582 B2 * | 9/2019 | Pierre | B65F 1/0033 |
| 2006/0233470 A1 | 10/2006 | Jacoby | |
| 2007/0114188 A1 | 5/2007 | Irvine | |
| 2013/0042919 A1 | 2/2013 | Lambke | |
| 2014/0262985 A1 | 9/2014 | Dorsett | |
| 2014/0305883 A1 | 10/2014 | Julian | |
| 2016/0137412 A1 | 5/2016 | Capetillo | |
| 2017/0246976 A1 | 8/2017 | Lutzer | |

* cited by examiner

*Primary Examiner* — Tuan N Nguyen
(74) *Attorney, Agent, or Firm* — Jim H. Salter; Inventive Law Inc.

(57) ABSTRACT

A trash receptacle for separating liquids and solids is disclosed. An example embodiment includes: a lid unit including a sink area for receiving waste liquids and a chute area for receiving waste solids; a removable and portable reservoir tank for retaining the waste liquids, the sink area including a connecting tube coupling the sink area to the removable and portable reservoir tank and enabling the waste liquids to flow from the sink area into the removable and portable reservoir tank; and the lid unit being configured to fit over the removable and portable reservoir tank and an opening of a trash container.

20 Claims, 15 Drawing Sheets

```
┌─────────────────────────────────────┐
│      METHOD FOR PROVIDING A         │
│ TRASH RECEPTACLE FOR SEPARATING     │
│       LIQUIDS AND SOLIDS            │
│              -1000-                 │
└─────────────────────────────────────┘
                  ↓
┌─────────────────────────────────────────────────────────┐
│ Assemble a lid unit including a sink area for receiving │
│ waste liquids and a chute area for receiving waste      │
│ solids.                                                 │
│                        -1010-                           │
└─────────────────────────────────────────────────────────┘
                  ↓
┌─────────────────────────────────────────────────────────┐
│ Assemble a reservoir tank for retaining the waste       │
│ liquids, the sink area including a connecting tube      │
│ coupling the sink area to the reservoir tank and        │
│ enabling the waste liquids to flow from the sink area   │
│ into the reservoir tank.                                │
│                        -1020-                           │
└─────────────────────────────────────────────────────────┘
                  ↓
┌─────────────────────────────────────────────────────────┐
│ Mount the assembled reservoir tank on an opening of a   │
│ trash container.                                        │
│                        -1030-                           │
└─────────────────────────────────────────────────────────┘
                  ↓
┌─────────────────────────────────────────────────────────┐
│ Mount the assembled lid unit on the reservoir tank.     │
│                        -1040-                           │
└─────────────────────────────────────────────────────────┘
                  ↓
                ( End )
```

Fig. 15

TRASH RECEPTACLE FOR SEPARATING LIQUIDS AND SOLIDS

PRIORITY PATENT APPLICATIONS

This is a non-provisional continuation-in-part patent application claiming priority to U.S. patent application, Ser. No. 15/894,232, filed Feb. 12, 2018; which is a non-provisional patent application claiming priority to U.S. provisional patent application, Ser. No. 62/458,431, filed Feb. 13, 2017; and to U.S. provisional patent application, Ser. No. 62/516,287, filed Jun. 7, 2017. This non-provisional patent application claims priority to the referenced patent applications. The entire disclosure of the referenced patent applications is considered part of the disclosure of the present application and is hereby incorporated by reference herein in its entirety.

TECHNICAL FIELD

The disclosed subject matter relates to the field of trash or garbage receptacles, and particularly although not exclusively, to a trash receptacle for separating liquids and solids.

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2016-2019, Mark Antony Pierre; All Rights Reserved.

BACKGROUND

Discarding and hauling trash is an expensive, environmentally hazardous, and injury-producing activity. One significant problem with discarding trash is the presence of liquids contaminating solids and recyclables in trash. The liquids in the trash contribute to excess weight and volume of the trash, undesirable $CO_2$ gas production from landfills, and unhealthy conditions for sanitation and landfill workers. As a result, the presence of liquids in trash produces a variety of problems, hazards, and costs.

SUMMARY

A trash receptacle for separating liquids and solids is disclosed. The trash receptacle for separating liquids and solids of various example embodiments can be a two-piece recycling separation system designed with two orifices, which can be mounted on top of a trash container or other trash or garbage container. A trash orifice of the trash receptacle provides a pass through chute straight into the trash container. A liquid orifice of the trash receptacle provides a catch area for liquid waste. When liquid is poured in the liquid orifice, the liquid is funneled down a drain and stored in a removable and portable reservoir tank for future disposal. Once the removable and portable reservoir tank is full, the tank can be removed and the waste liquid can easily be discarded or recycled by removing a screw cap and pouring the liquid content into a sink/drain or proper recycling container. The solid trash placed in the trash orifice passes directly through the lid and reservoir tank of the trash receptacle. The solid trash is directed dry into the trash container. Once the trash container is full, an individual can lift off the lid and reservoir tank of the trash receptacle and remove the solid trash from the trash container.

BRIEF DESCRIPTION OF THE DRAWINGS

Embodiments are illustrated by way of example and not limitation in the figures of the accompanying drawings, in which:

FIG. 15 illustrates a flow diagram representing a sequence of operations performed in a method according to an example embodiment.

DETAILED DESCRIPTION

Figure 1:
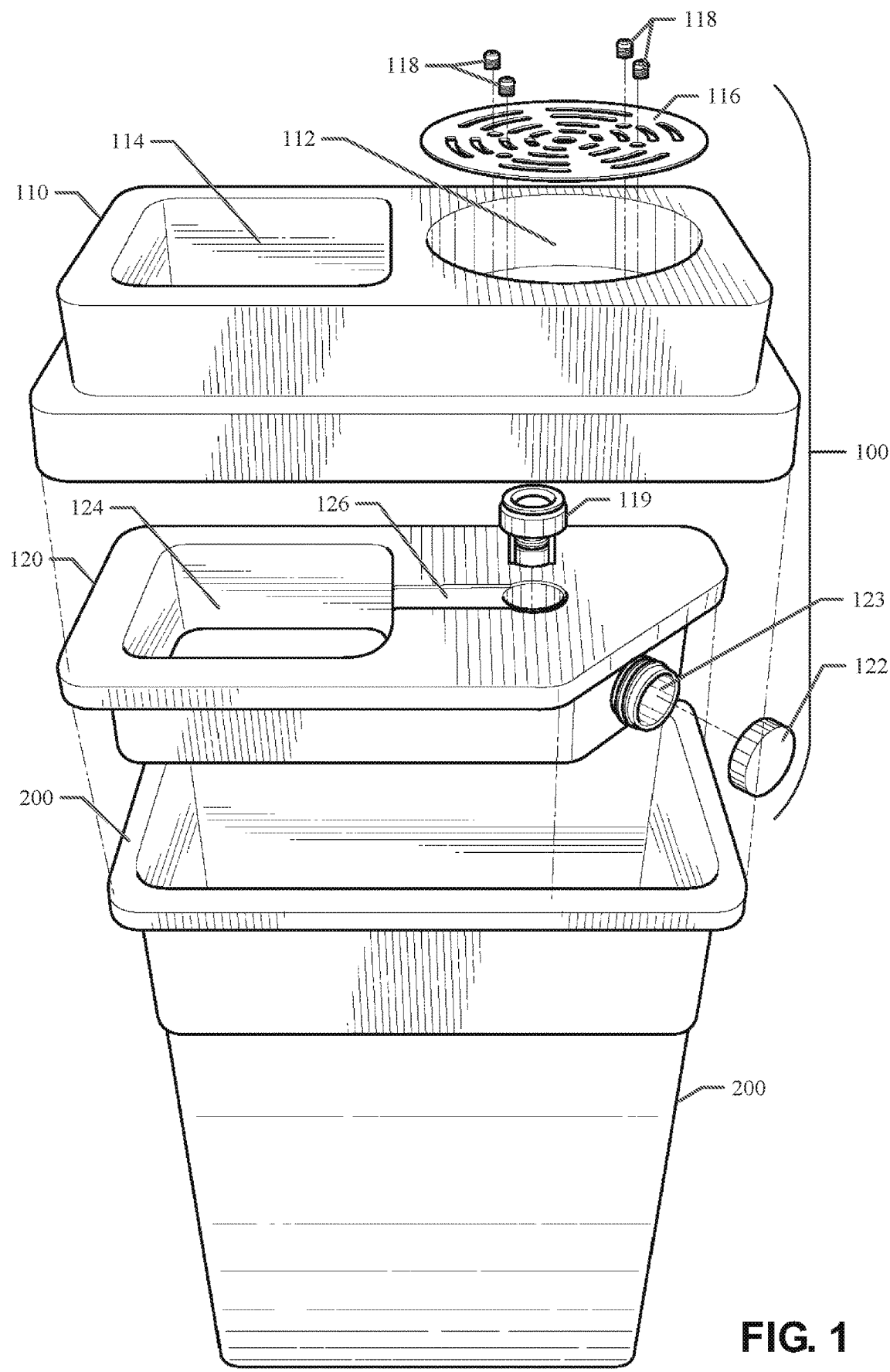
FIG. 1 illustrates a blown-up version of an example embodiment interacting with a trash container.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is disclosed, illustrated, and claimed a trash receptacle for separating liquids and solids. The example embodiments disclosed herein provide an apparatus, system, and method implemented as a trash receptacle for separating liquids and solids, which can be used in a variety of applications. The trash receptacle for separating liquids and solids of various example embodiments can be a two-piece recycling separation system designed with two orifices, which can be mounted on top of a trash container or other trash or garbage container. A trash orifice of the trash receptacle provides a pass through chute straight into the trash container. A liquid orifice of the trash receptacle provides a catch area for liquid waste. When liquid is poured in the liquid orifice, the liquid is funneled down a drain and stored in a reservoir tank for future disposal. Once the reservoir tank is full, the tank can be removed and the waste liquid can easily be discarded or recycled by removing a screw cap and pouring the liquid content into a sink/drain or proper recycling container. The solid trash placed in the trash orifice passes directly through the lid and reservoir tank of the trash receptacle. The solid trash is directed dry into the trash container. Once the trash container is full, an individual can lift off the lid and reservoir tank of the trash receptacle and remove the solid trash from the trash container.

In an example embodiment, the two-piece system comprises a fitted plastic lid unit 5.5"×20.25"×11.5" (H×W×D) and a plastic reservoir tank 4.5"×20"×11.25" (H×W×D). The lid unit is made with a 7.25"×8" pass through chute for solid trash and a round 7" sink area with a catch drain for waste liquids. The lid unit is designed to be mounted on top of the reservoir tank when the trash receptacle is assembled. When the lid unit is mounted on top of the reservoir tank, the drain tube of the lid unit depresses the top of a plastic spring loaded check valve. When the trash receptacle is assembled, liquid poured in the sink area of the lid unit flows freely into the reservoir tank. Once the reservoir tank is full, the lid unit can be removed, thereby causing the check valve to close and providing a liquid tight reservoir tank. The reservoir tank is then ready to be transported and content disposed of using a proper recycling method. The assembled trash receptacle can be mounted on an opening of any 23-gallon rectangular trash container. The disclosed embodiments can be universal, fitting many different configurations and shapes of trash containers with slight variations of measurements.

Referring now to FIGS. 1 through 9, example embodiments of the trash receptacle 100 for separating liquids and solids are illustrated. FIG. 1 illustrates a blown-up version of an example embodiment interacting with a trash container 200. Referring now to FIG. 1, the trash receptacle 100 includes a lid unit 110 and a reservoir tank 120. The lid unit 110 includes a sink area 112 for receiving waste liquids and a chute area 114 for receiving waste solids. The sink area 112 and the chute area 114 can be fabricated as a single integrated component. The sink area 112 includes a stainless-steel grate 116 to strain off any large items that may be placed in the sink area 112. Stainless steel screws 118 can be used to hold the stainless-steel grate 116 in place in the sink area 112. The lid unit 110 includes the sink area 112 for receiving liquids and the chute area 114 for receiving solids, which pass through a corresponding chute 124 of the reservoir tank 120 and straight into the trash container 200. The stainless steel screws 118 can be configured so that the stainless-steel grate 116 can be attached in place in the sink area 112 and detached for cleaning purposes.

In the example embodiment shown in FIG. 1, the sink area 112 also includes a drain with a connecting tube 119 at the base of the sink area 112. The drain and connecting tube 119 can be configured with a check valve, which is depressed and opened when the lid unit 110 is attached to the reservoir tank 120. The drain with the connecting tube 119 and the open check valve enable liquid to flow from the sink area 112 into the reservoir tank 120 via the drain with the connecting tube 119 when the lid unit 110 is attached to the reservoir tank 120. The check valve can be configured to close and prevent the leakage of liquid when the lid unit 110 is detached from the reservoir tank 120. In an example embodiment, the check valve can be a plastic spring-loaded check valve, which permits liquids to enter the reservoir tank 120 from the lid unit 110 when the lid unit 110 is attached to the reservoir tank 120. When the lid unit 110 is removed or detached from the reservoir tank 120 and the trash receptacle 100 is disassembled, the check valve reverts to the closed position preventing the leakage of liquids from the reservoir tank 120. When the lid unit 110 is placed on the reservoir tank 120 and the trash receptacle 100 is assembled, the check valve is depressed into the open position and liquid from the sink area 112 can flow into the reservoir tank 120 via the drain with the connecting tube 119. In an example embodiment, the reservoir tank 120 can be a 1.7-gallon reservoir tank. The reservoir tank 120 can be configured to include a threaded cap 122, which seals a threaded exit port 123 of the reservoir tank 120. The exit port 123 can be used to empty the liquid contents of the reservoir tank 120. The reservoir tank 120 can also be configured to include a drain channel 126 extending from the drain with the connecting tube 119 to the chute 124. The drain channel 126 provides a depression or groove to direct any excess liquid from the drain with the connecting tube 119 to the chute 124.

In the example embodiment, the trash container 200 can be a 23-gallon trash container with a generally rectangular opening at the top. The trash receptacle 100 of one example embodiment can be configured in a generally rectangular shape to fit over the generally rectangular opening at the top of the trash container 200. As described in more detail below, the trash receptacle 100 of various other example embodiments can be configured in other shapes (e.g., circular or oval) to fit over the openings of trash containers of varying other shapes.

Figure 2:
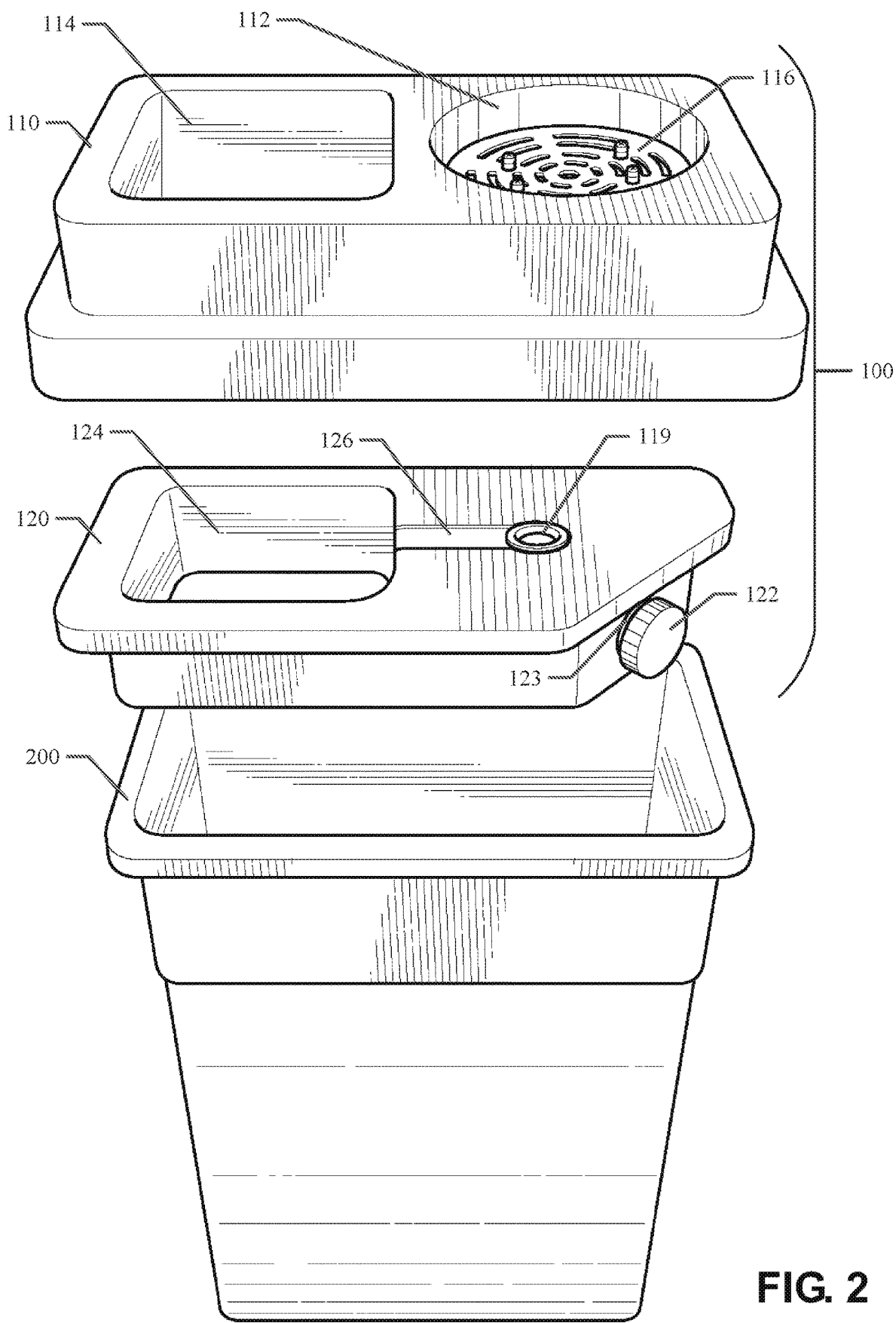
FIG. 2 illustrates a blown-up version of an example embodiment interacting with a trash container, wherein a stainless-steel grate is mounted into a sink area and a threaded cap is attached on a threaded drain spout.

FIG. 2 illustrates a blown-up version of an example embodiment interacting with a trash container 200, wherein the stainless-steel grate 116 is mounted into the sink area 112 and the threaded cap 122 is screwed on the threaded drain spout 123. As shown in FIG. 2, the lid unit 110 is fully assembled and ready to be placed on the fully assembled reservoir tank 120. The fully assembled lid unit 110 can be placed on the fully assembled reservoir tank 120, causing the check valve in the drain with the connecting tube 119 to open and enable fluid flow from the sink area 112 to the reservoir tank 120. The assembled trash receptacle 100 of the example embodiment can then be placed on the opening of the trash container 200. As a result, the trash container 200 with the installed trash receptacle 100 provides a trash receptacle for separating liquids and solids.

Figure 3:
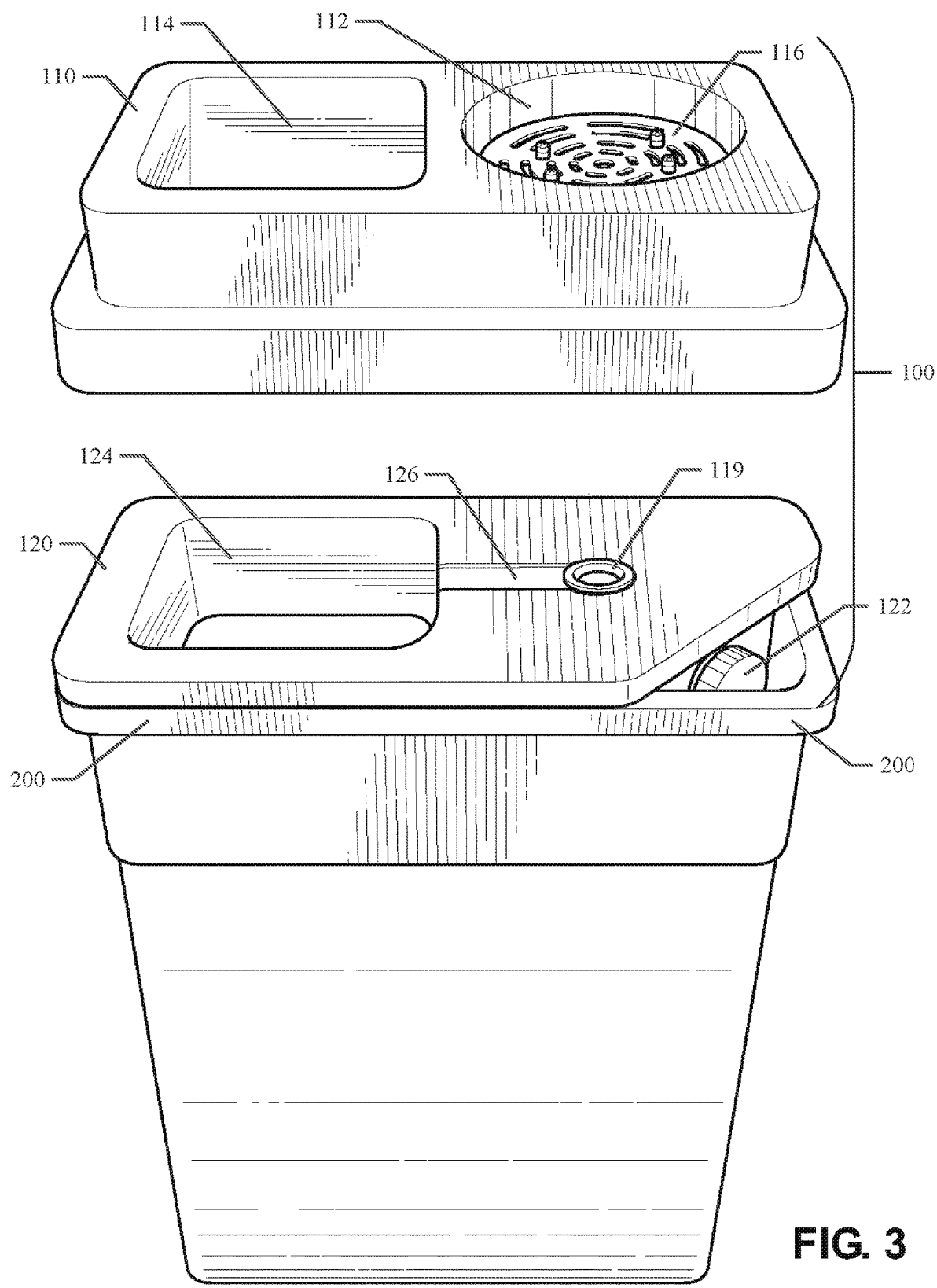
FIG. 3 illustrates a blown-up version of an example embodiment interacting with a trash container, wherein the reservoir tank assembly is inserted into an opening of the trash container.

FIG. 3 illustrates a blown-up version of an example embodiment interacting with a trash container 200, wherein the fully assembled reservoir tank 120 is inserted into the opening of the trash container 200. As shown in FIG. 3, the lid unit 110 is fully assembled and ready to be placed on the fully assembled reservoir tank 120. The fully assembled reservoir tank 120 can be placed on the opening of the trash container 200. Then, the fully assembled lid unit 110 can be placed on the fully assembled reservoir tank 120, causing the check valve in the drain with the connecting tube 119 to open and enable fluid flow from the sink area 112 to the reservoir tank 120. The assembled trash receptacle 100 of the example embodiment can remain mounted on the opening of the trash container 200 while in use. As a result, the trash container 200 with the installed trash receptacle 100 provides a trash receptacle for separating liquids and solids.

Figure 4:
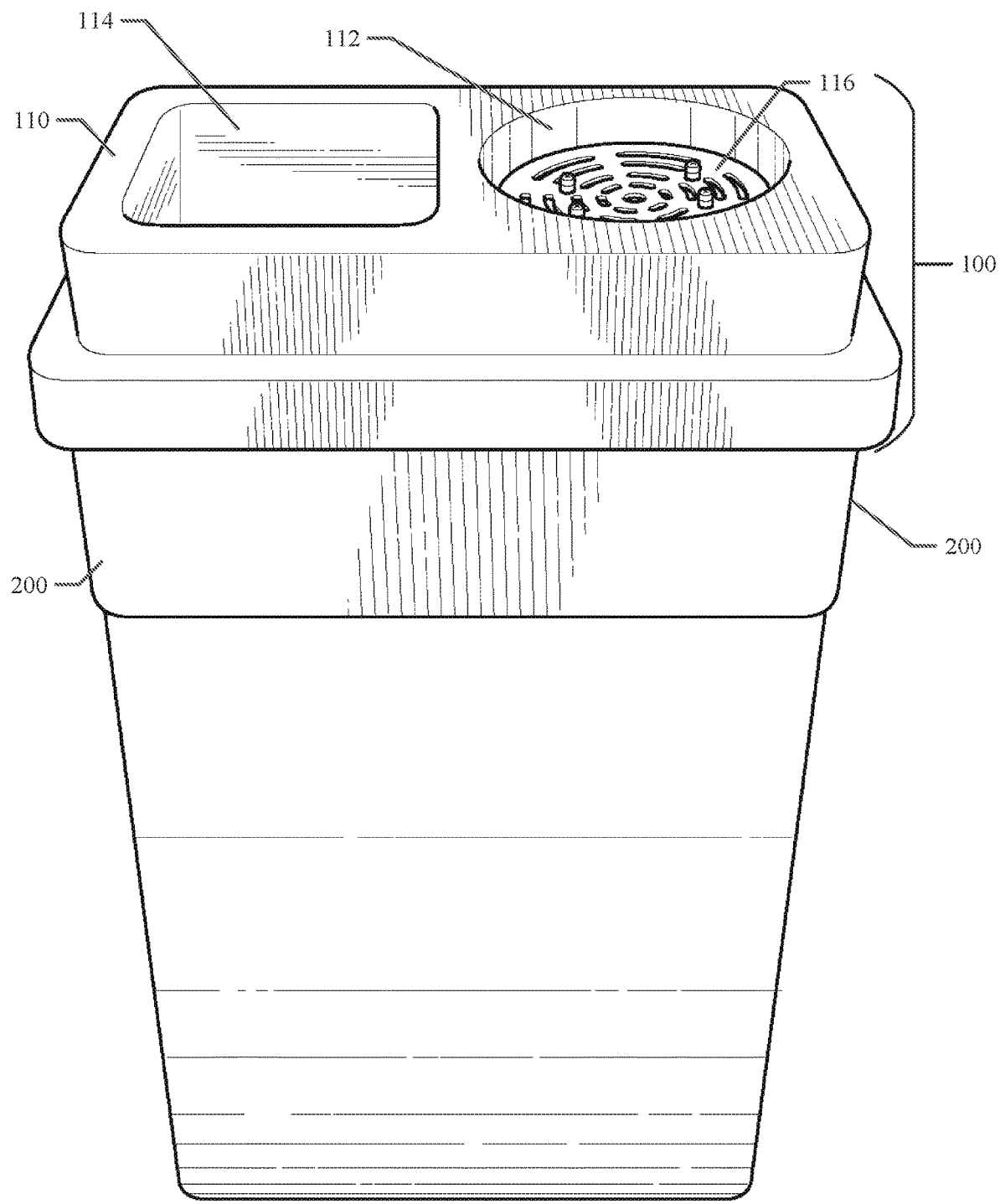
FIG. 4 illustrates an example embodiment, wherein the assembled lid and reservoir tank assembly are mounted and inserted into an opening of the trash container.

FIG. 4 illustrates an example embodiment, wherein the fully assembled lid unit 110 and the fully assembled reservoir tank 120 are mounted into the open top of the trash container 200. As described above, the placement of the fully assembled lid unit 110 on the fully assembled reservoir tank 120 causes the check valve in the drain with the connecting tube 119 to open and enable fluid flow from the sink area 112 to the reservoir tank 120. Additionally, the chute area 114 is configured for receiving solid (non-liquid) material, which passes through the corresponding chute 124 of the reservoir tank 120 and straight into the trash container 200. The assembled trash receptacle 100 of the example embodiment can remain mounted on the opening of the trash container 200 while in use. As a result, the trash container 200 with the installed trash receptacle 100 provides a trash receptacle for separating liquids and solids.

Figure 5:
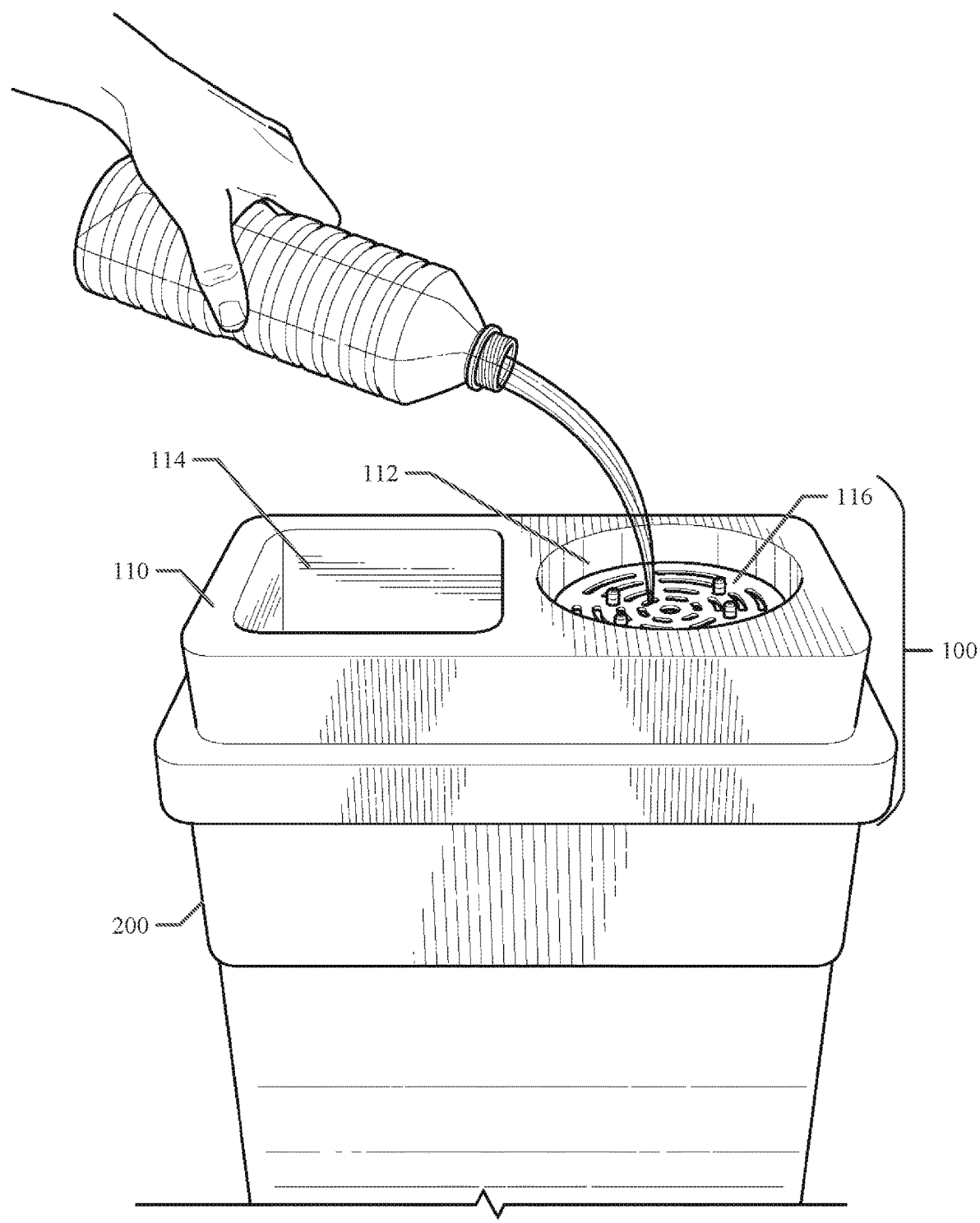
FIG. 5 illustrates an example usage of the trash receptacle for separating liquids and solids, wherein liquids are poured into the sink area and transported into the reservoir tank.

FIG. 5 illustrates an example usage of the trash receptacle 100 for separating liquids and solids, wherein liquids are poured into the sink area 112 and transported into the reservoir tank 120 as described above. The check valve in the drain with the connecting tube 119 is open and enables fluid flow from the sink area 112 to the reservoir tank 120 via the drain with the connecting tube 119. The waste liquids can be stored in the reservoir tank 120 for later disposal.

Figure 6:
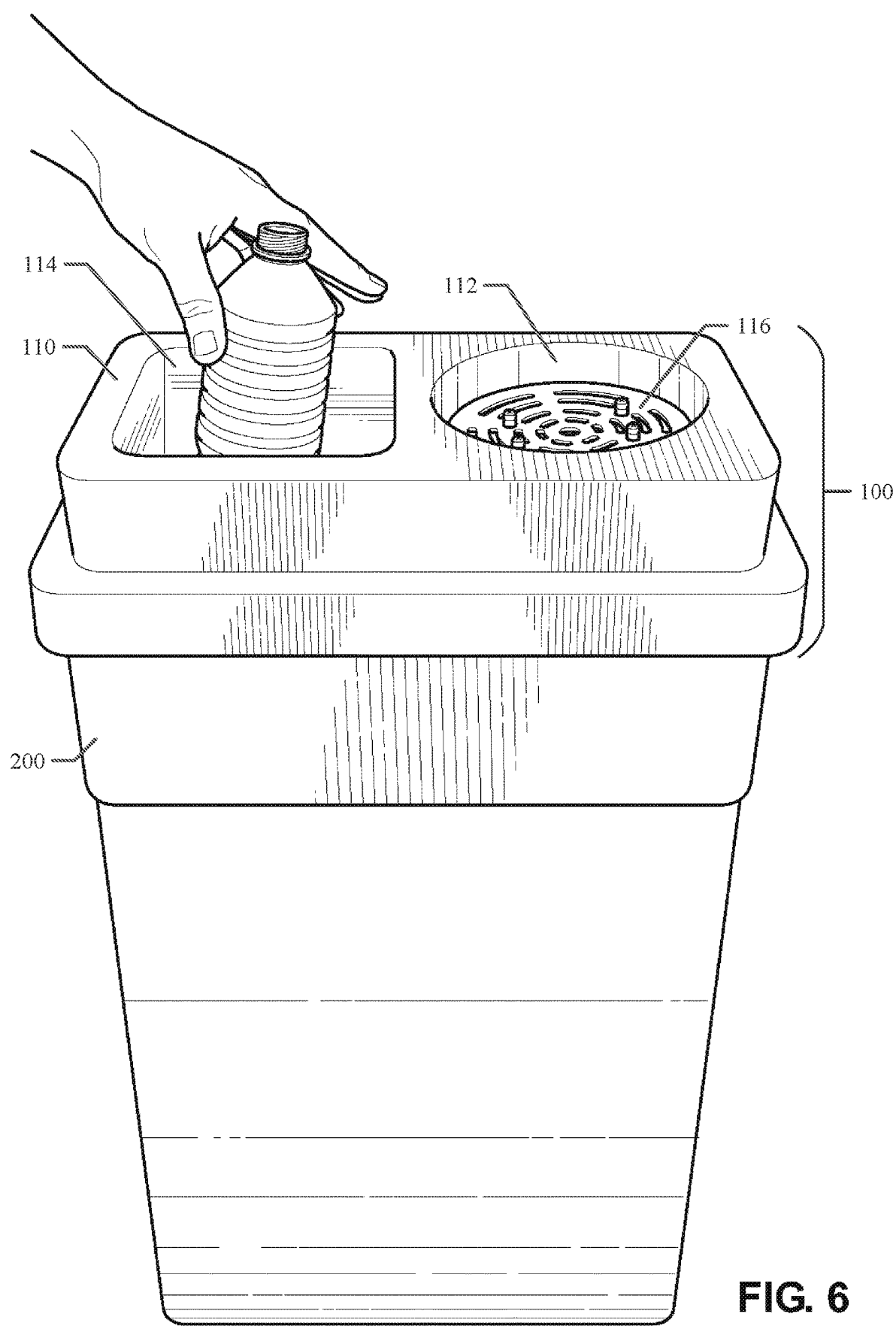
FIG. 6 illustrates an example usage of the trash receptacle for separating liquids and solids, wherein solid waste is discarded through the trash chute and passed into the trash container.

FIG. 6 illustrates an example usage of the trash receptacle 100 for separating liquids and solids, wherein solid waste is discarded through the chute area 114 and passed into the trash container 200. As shown, the solid waste can be discarded through the chute area 114, which passes through a corresponding chute 124 of the reservoir tank 120 and straight into the trash container 200. As a result, the trash receptacle 100 enables solid waste to be passed through the trash receptacle 100 and into the trash container 200.

Figure 7:
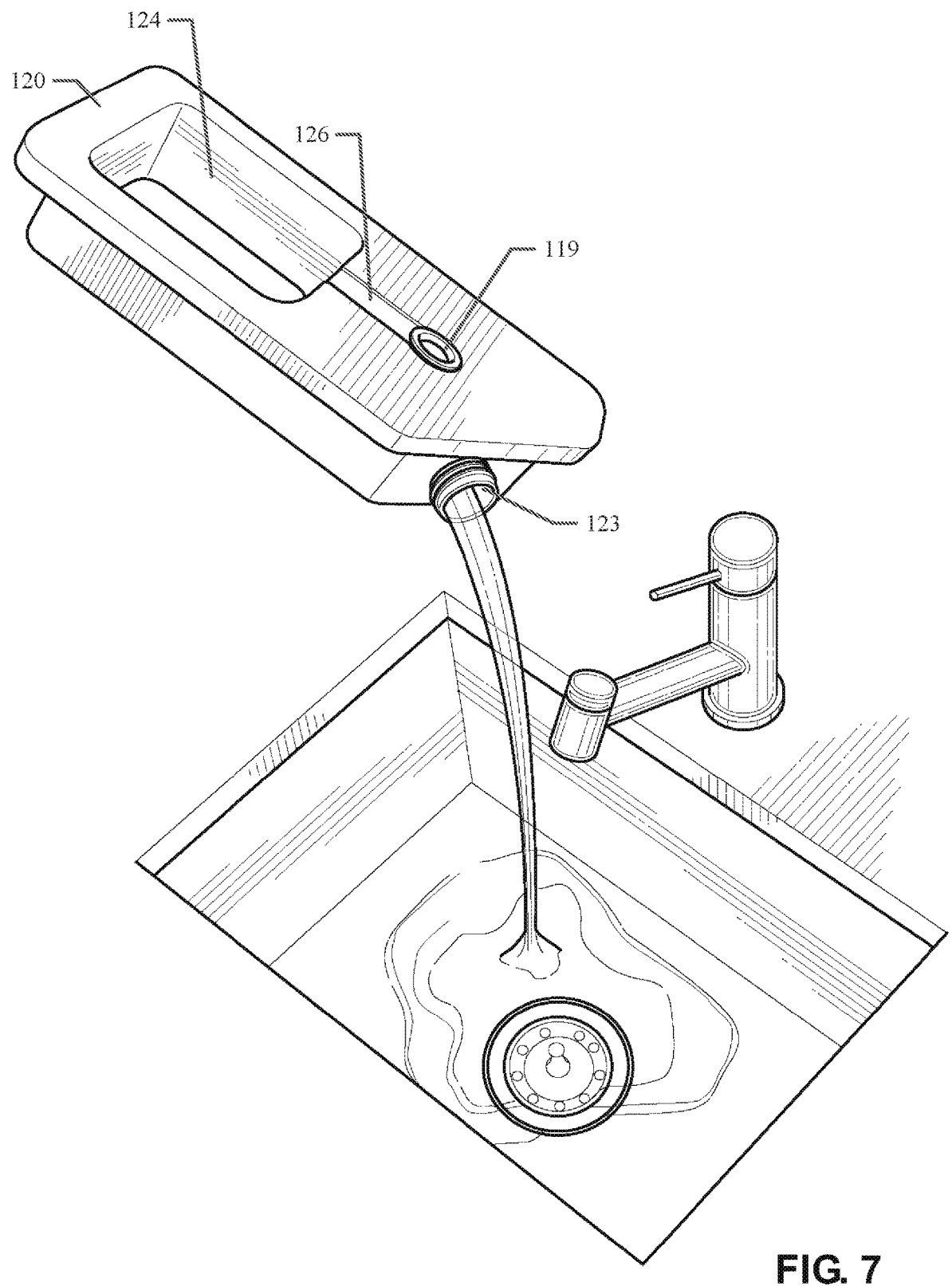
FIG. 7 illustrates an example embodiment, wherein the reservoir tank cap is removed and waste liquid is discarded into a sink.

FIG. 7 illustrates an example embodiment, wherein the waste liquid can be emptied from the reservoir tank 120. Referring now to FIG. 7, the reservoir tank 120 is shown detached or disassembled from the lid unit 110. As described above, when the reservoir tank 120 is detached from the lid unit 110, the check valve in the drain with the connecting tube 119 is configured to close and prevent leakage of liquid from the reservoir tank 120. When the lid unit 110 is removed from the reservoir tank 120 and the trash receptacle 100 is disassembled, the threaded cap 122 of the reservoir tank 120 can be removed to enable the waste liquid to be discarded via the threaded exit port 123 of the reservoir tank 120. In this manner, the reservoir tank 120 can be periodically emptied.

Figure 8:
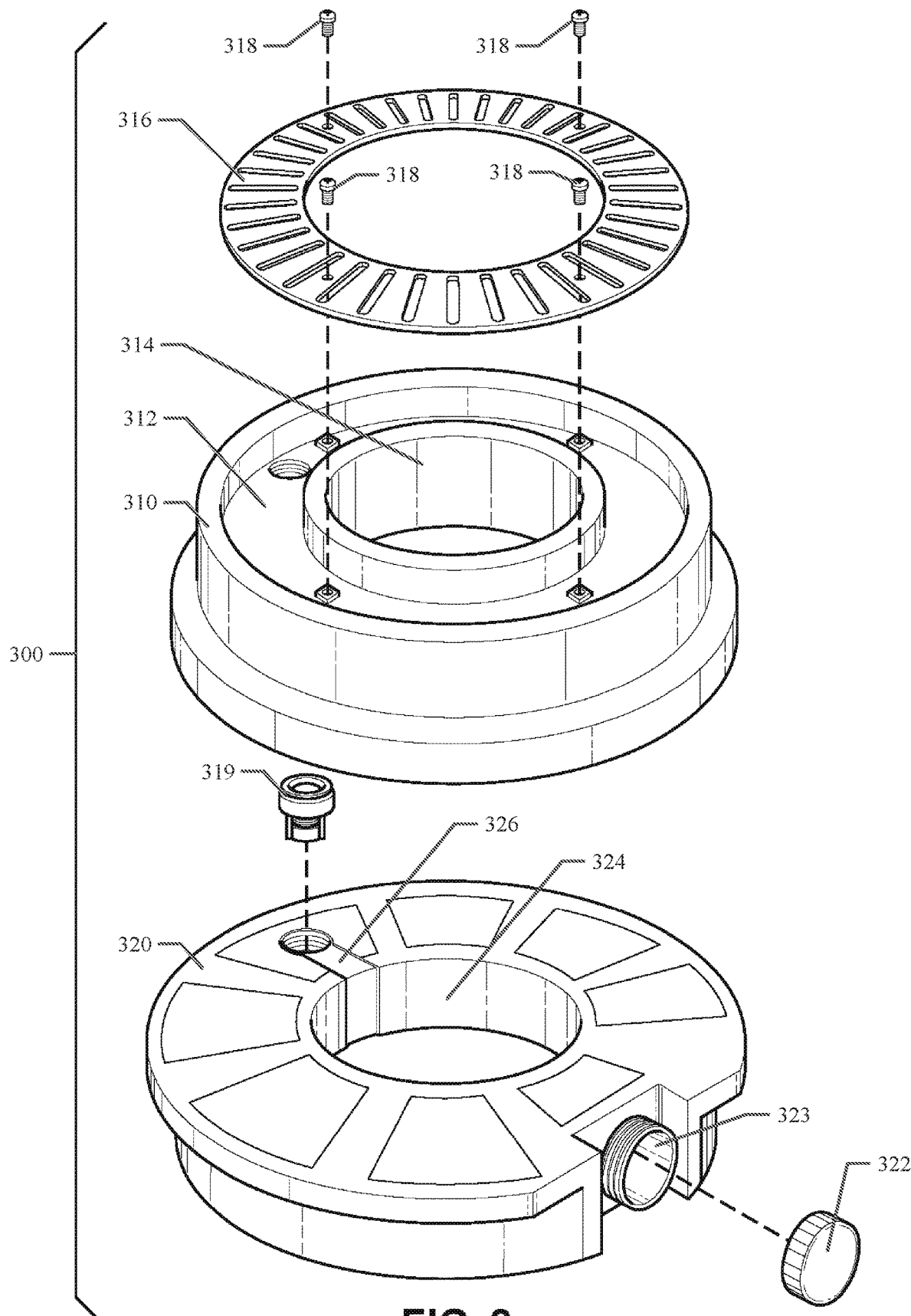
FIG. 8 illustrates a blown-up disassembled version of an alternative example embodiment for use with a round trash container.

FIG. 8 illustrates a blown-up disassembled version of an alternative example embodiment for use with a round trash container. Referring now to FIG. 8, the trash receptacle 300 includes a round lid unit 310 and a round reservoir tank 320. The lid unit 310 includes a sink area 312 for receiving waste liquids and a chute area 314 for receiving waste solids. The sink area 312 includes a stainless-steel grate 316 to strain off any large items that may be placed in the sink area 312. Stainless steel screws 318 can be used to hold the stainless-steel grate 316 in place in the sink area 312. The lid unit 310 includes the sink area 312 for receiving liquids and the chute area 314 for receiving solids, which pass through a corresponding chute 324 of the reservoir tank 320 and straight into the trash container 400. The stainless steel screws 318 can be configured so that the stainless-steel grate 316 can be attached in place in the sink area 312 and detached for cleaning purposes.

In the example embodiment shown in FIG. 8, the sink area 312 also includes a drain with a connecting tube 319 at the base of the sink area 312. The drain and connecting tube 319 can be configured with a check valve, which is depressed and opened when the lid unit 310 is attached to the reservoir tank 320. The drain with the connecting tube 319 and the open check valve enable liquid to flow from the sink area 312 into the reservoir tank 320 via the drain with the connecting tube 319 when the lid unit 310 is attached to the reservoir tank 320. The check valve can be configured to close and prevent the leakage of liquid when the lid unit 310 is detached from the reservoir tank 320. In an example embodiment, the check valve can be a plastic spring-loaded check valve, which permits liquids to enter the reservoir tank 320 from the lid unit 310 when the lid unit 310 is attached to the reservoir tank 320. When the lid unit 310 is removed from the reservoir tank 320 and the trash receptacle 300 is disassembled, the check valve reverts to the closed position preventing the leakage of liquids from the reservoir tank 320. When the lid unit 310 is placed on the reservoir tank 320 and the trash receptacle 300 is assembled, the check valve is depressed into the open position and liquid from the sink area 312 can flow into the reservoir tank 320 via the drain with the connecting tube 319. In an example embodiment, the reservoir tank 320 can be a two gallon reservoir tank. The reservoir tank 320 can be configured to include a threaded cap 322, which seals a threaded exit port 323 of the reservoir tank 320. The exit port 323 can be used to empty the liquid contents of the reservoir tank 320. The reservoir tank 320 can also be configured to include a drain channel 326 extending from the drain with the connecting tube 319 to the chute 324. The drain channel 326 provides a depression or groove to direct any excess liquid from the drain with the connecting tube 319 to the chute 324.

Figure 9:
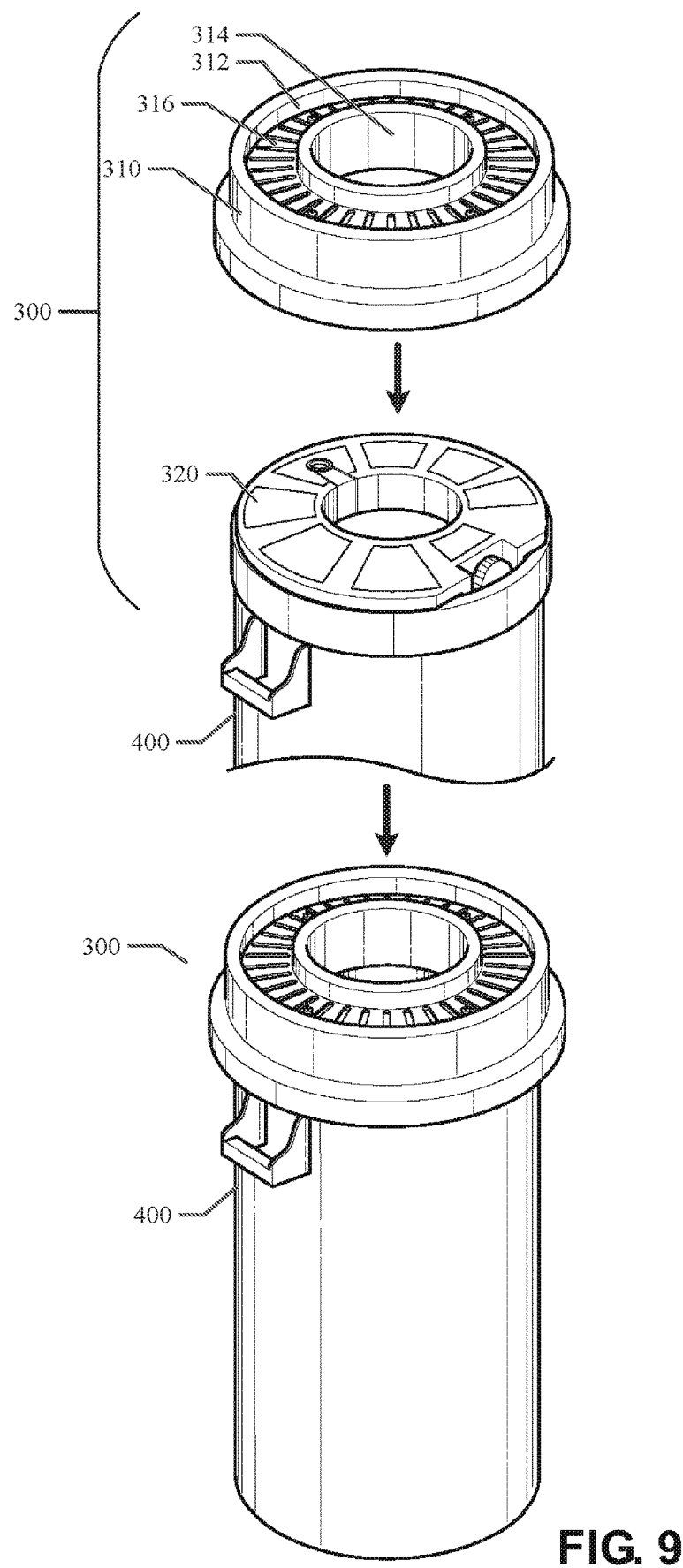
FIG. 9 illustrates a blown-up assembled version of an alternative example embodiment for use with a round trash container.

FIG. 9 illustrates a blown-up assembled version of the alternative example embodiment for use with a round trash container 400. Referring now to FIG. 9, the trash container 400 can be a 44-gallon trash container with a generally round opening at the top. The trash receptacle 300 of one example embodiment can be configured in a generally round shape to fit over the generally round opening at the top of the trash container 400. As described in more detail herein, the trash receptacle 300 of various other example embodiments can be configured in other shapes to fit over the openings of trash containers of varying other shapes.

Figure 10:
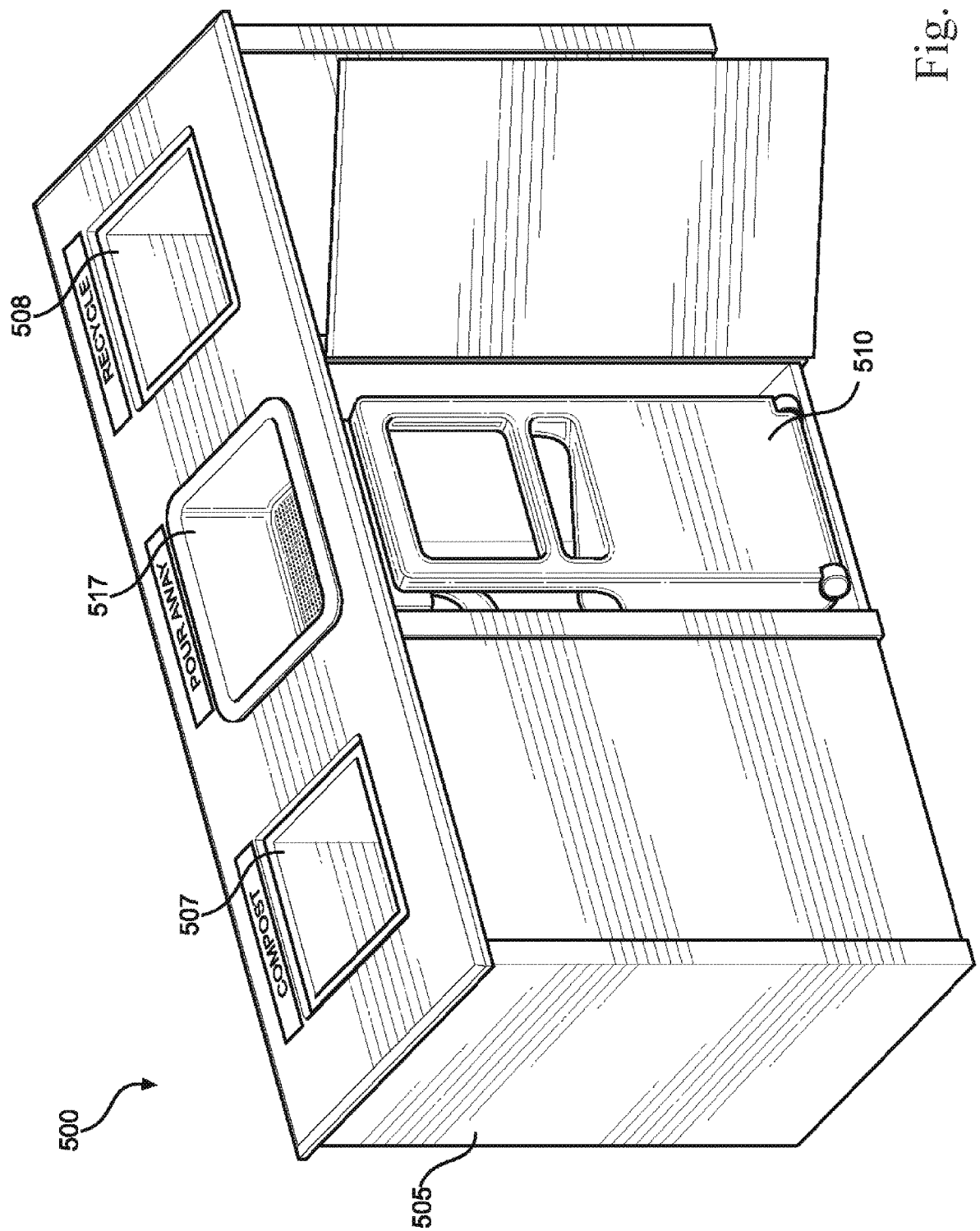
FIG. 10 illustrates an assembled version of an alternative example embodiment integrated in a cabinet with a removable and portable reservoir tank inserted into the cabinet.

FIG. 10 illustrates an assembled version of an alternative example embodiment 500 integrated in a cabinet 505 with a removable and portable reservoir tank 510 inserted into the cabinet 505. The cabinet 505 can include a compost waste receptacle 507 and a recycle waste receptacle 508 for solid waste disposal. The cabinet 505 can also include a sink area 517 for liquid disposal.

Figure 11:
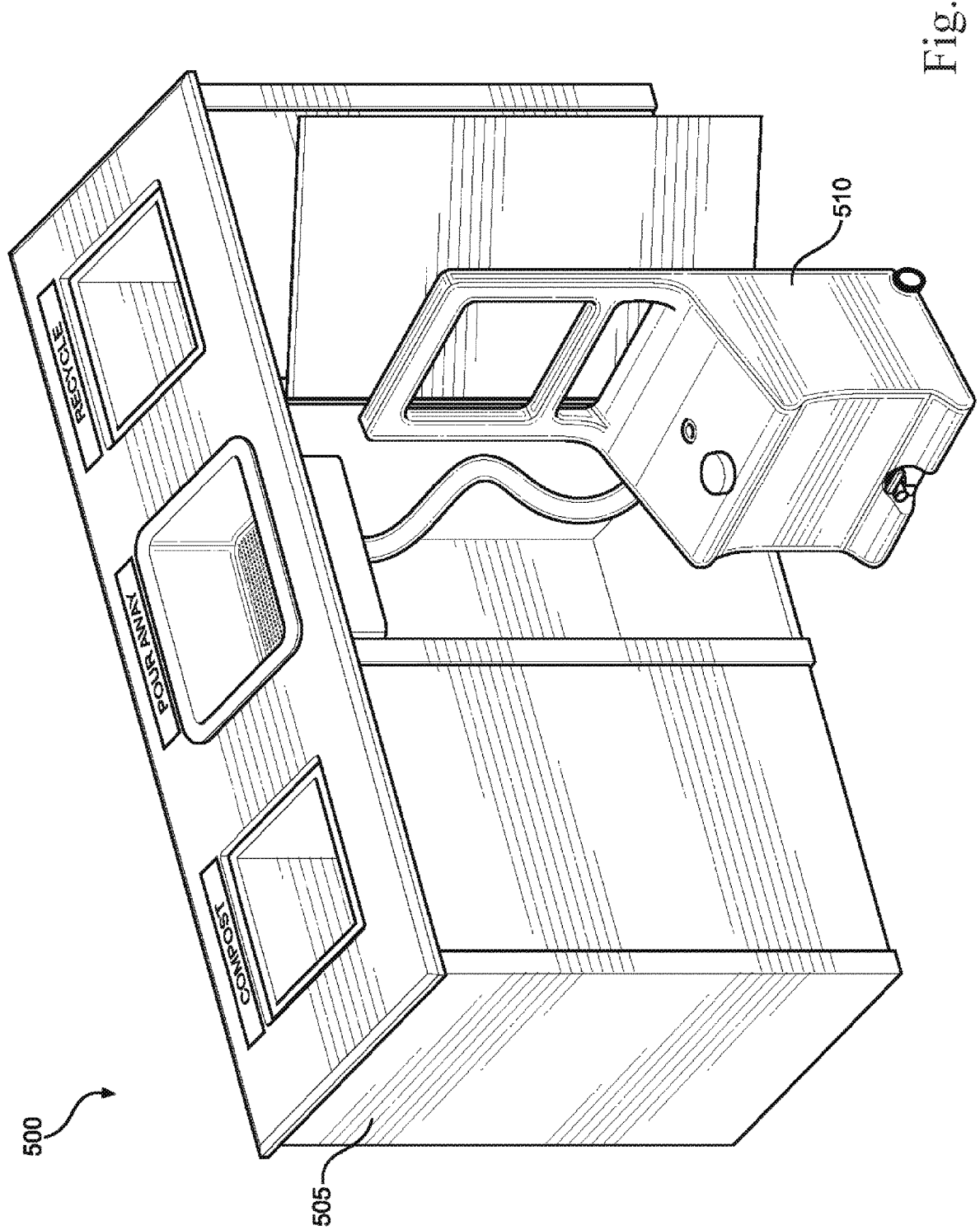
FIG. 11 illustrates an alternative example embodiment integrated in a cabinet with the removable and portable reservoir tank removed from the cabinet.

FIG. 11 illustrates the alternative example embodiment 500 integrated in a cabinet 505 with the removable and portable reservoir tank 510 removed from the cabinet 505.

Figure 12:
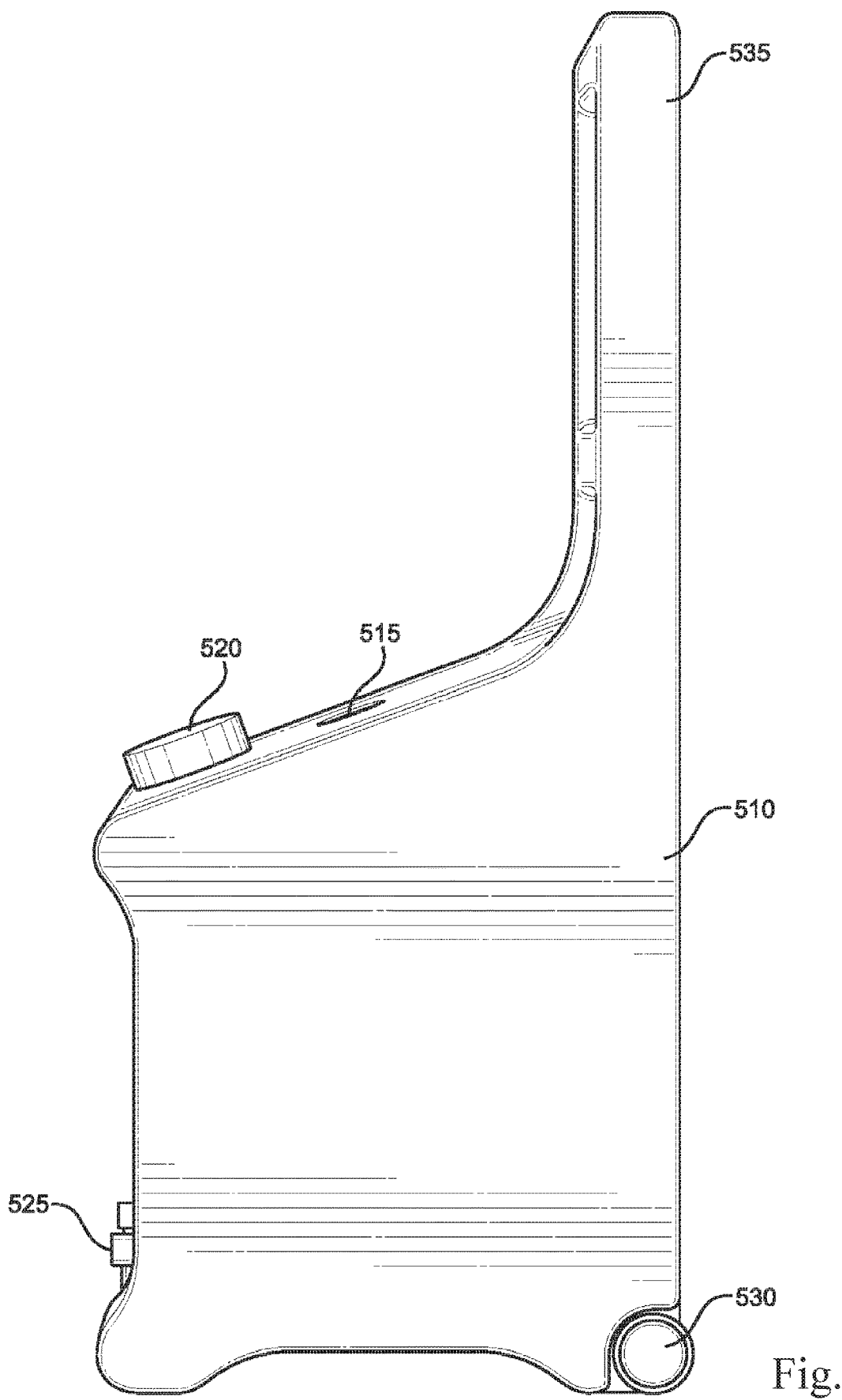
FIG. 12 illustrates a side view of the removable and portable reservoir tank of an alternative example embodiment.

FIG. 12 illustrates a side view of the removable and portable reservoir tank 510 of an alternative example embodiment. The reservoir tank 510 includes a connecting tube valve 515 to connect the reservoir tank 510 to the sink area 517 of the cabinet 505, an exit port 520 used to empty the liquid contents of the reservoir tank 510, and a drain valve 525 also used to empty the liquid contents of the reservoir tank 510. In the example embodiment, the reservoir tank 510 can also include wheels 530 and a handle 535 for portability and mobility.

Figure 13:
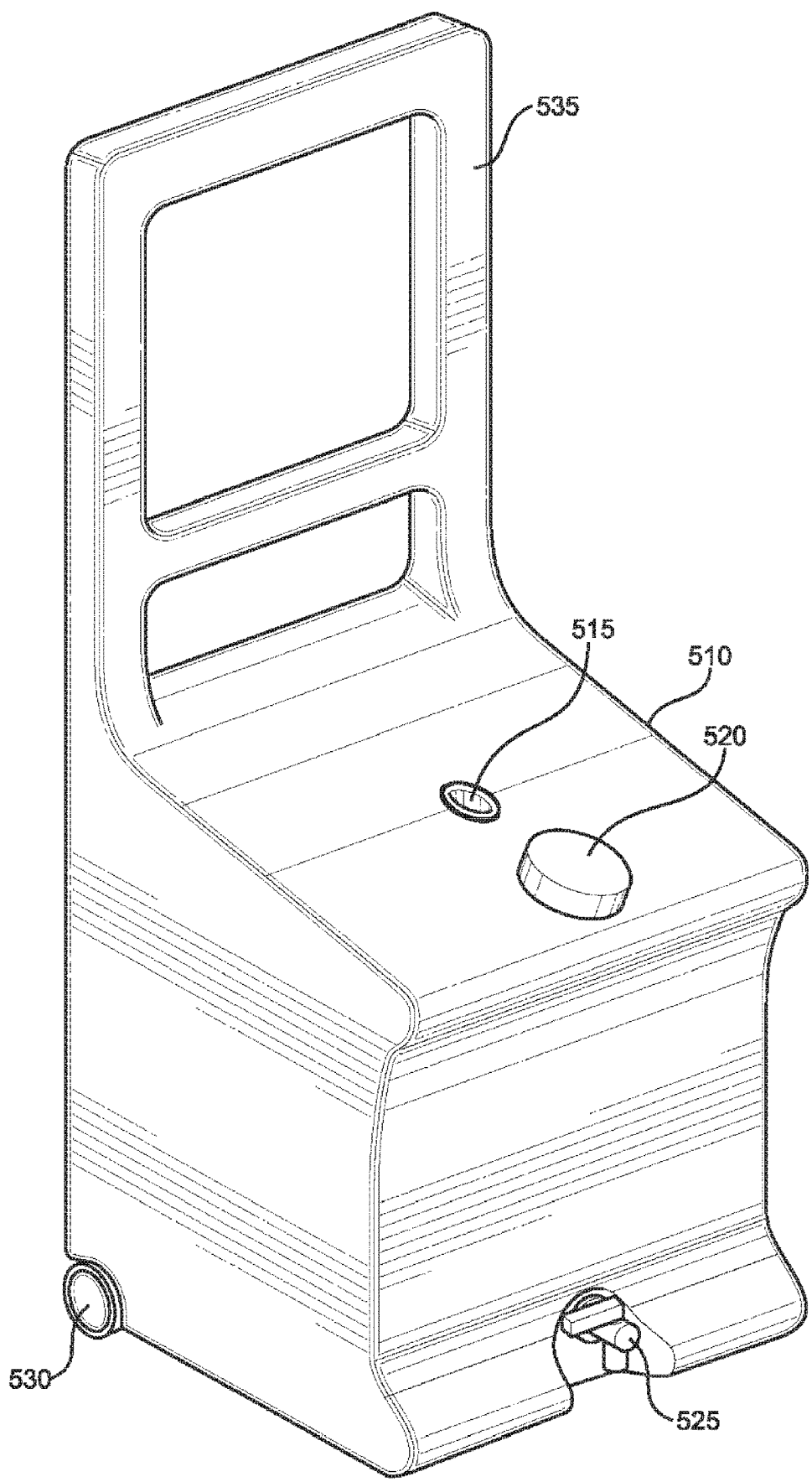
FIG. 13 illustrates a front perspective view of the removable and portable reservoir tank of an alternative example embodiment.

FIG. 13 illustrates a front perspective view of the removable and portable reservoir tank of an alternative example embodiment. The reservoir tank 510 includes a connecting tube valve 515 to connect the reservoir tank 510 to a sink area 517 of the cabinet 505, an exit port 520 used to empty the liquid contents of the reservoir tank 510, and a drain valve 525 also used to empty the liquid contents of the reservoir tank 510. In the example embodiment, the reservoir tank 510 can also include wheels 530 and a handle 535 for portability and mobility.

Figure 14:
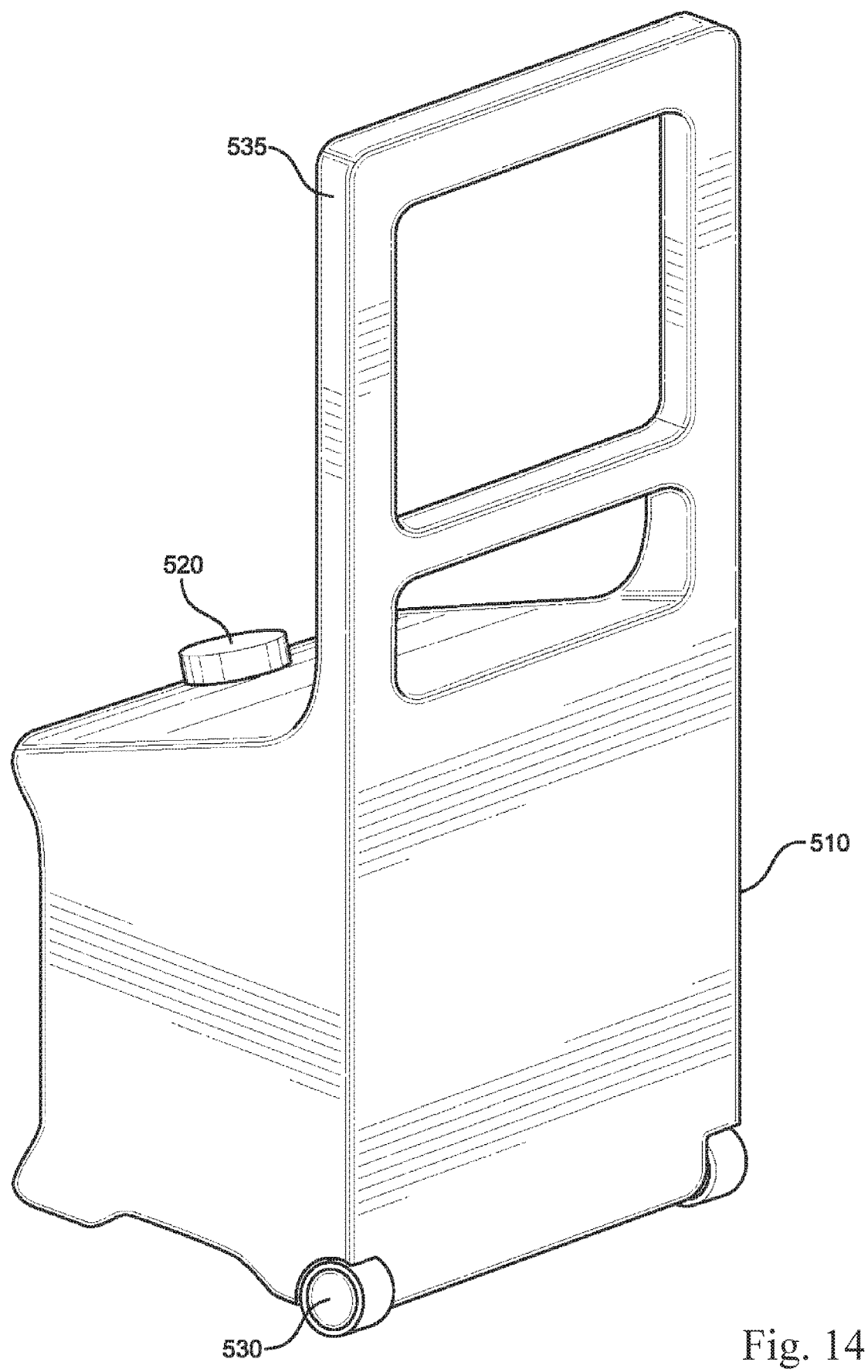
FIG. 14 illustrates a rear perspective view of the removable and portable reservoir tank of an alternative example embodiment.

FIG. 14 illustrates a rear perspective view of the removable and portable reservoir tank of an alternative example embodiment. The reservoir tank 510 includes a connecting tube valve 515 (not shown) to connect the reservoir tank 510 to a sink area 517 of the cabinet 505, an exit port 520 used to empty the liquid contents of the reservoir tank 510, and a drain valve 525 (not shown) also used to empty the liquid contents of the reservoir tank 510. In the example embodiment, the reservoir tank 510 can also include wheels 530 and a handle 535 for portability and mobility. In each of these alternative embodiments, the removable and portable reservoir tank 510 can be fabricated from a plastic material.

FIG. 15 illustrates a flow diagram representing a sequence of operations performed in a method according to an example embodiment. In accordance with the example method 1000, the method comprises: assembling a lid unit including a sink area for receiving waste liquids and a chute area for receiving waste solids (operation 1010); assembling a reservoir tank for retaining the waste liquids, the sink area including a connecting tube coupling the sink area to the reservoir tank and enabling the waste liquids to flow from the sink area into the reservoir tank (operation 1020); mounting the assembled reservoir tank on an opening of a trash container (operation 1030); and mounting the assembled lid unit on the reservoir tank (operation 1040).

The various example embodiments disclosed herein solve the problem of liquids contaminating solids and recyclables in trash and thereby improve the related technology. The various example embodiments disclosed herein reduce costs for hauling unnecessary liquid weight, reduce CO2 gas production from landfills, and reduce the number one cause of workers compensation claims in the U.S., which is back injuries. The disclosed example embodiments offer a user the ability to separate his or her liquids from solids when discarding waste by offering a sink area in the trash receptacle, which is used to catch liquid, direct it to a liquid tight reservoir tank, and retain the liquid to be discarded at a future time.

By reducing liquids in trash, the energy used to haul the trash is reduced. Liquid has a weight of 8.3 lbs. per gallon. Thus, reducing weight of the trash reduce the energy and costs related to hauling the trash. Additionally, the disclosed example embodiments reduce the volume of liquid in landfills. Both of these benefits produced by the disclosed example embodiments help to reduce CO2 emissions and greenhouse gases. The disclosed example embodiments offer a way separate the weight of heaver liquids allowing the user the ability to pour liquids down the drain thereby providing organic liquid a free ride to the treatment plant rather than incurring the costly expense of transporting the liquid waste by truck to a landfill. Reducing weight and liquid from trash prevents the primary cause of worker's compensation and general liability claims in the U.S., which is back injuries and slip and fall incidents. No other mechanism offers a system by which a user can separate liquid from trash and store the liquid for later discard.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used only for descriptive purposes and not to be construed as limiting. The elements, materials, geometries, dimensions, and sequence of operations may all be varied for particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, a trash receptacle for separating liquids and solids is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A trash receptacle for separating liquids and solids comprising:
   a lid unit including a sink area for receiving waste liquids and a chute area for receiving waste solids;
   a removable and portable reservoir tank for retaining the waste liquids, the sink area including a connecting tube coupling the sink area to the reservoir tank and enabling the waste liquids to flow from the sink area into the reservoir tank, the removable and portable reservoir tank including a handle and wheels; and the lid unit being configured to fit over the removable and portable reservoir tank and an opening of a trash container.

2. The trash receptacle for separating liquids and solids of claim 1 wherein the sink area and the chute area of the lid unit are integrated into a single component.

3. The trash receptacle for separating liquids and solids of claim 1 wherein the sink area includes a stainless-steel grate to strain off any large items that may be placed in the sink area.

4. The trash receptacle for separating liquids and solids of claim 1 wherein the sink area includes a drain connectable to the connecting tube for disposal of liquids into the removable and portable reservoir tank.

5. The trash receptacle for separating liquids and solids of claim 1 wherein the connecting tube includes a check valve configured to be open when the lid unit is coupled to the removable and portable reservoir tank, the check valve being configured to be closed when the lid unit is detached from the removable and portable reservoir tank.

6. The trash receptacle for separating liquids and solids of claim 1 wherein the removable and portable reservoir tank includes an exit port for draining the contents of the removable and portable reservoir tank.

7. The trash receptacle for separating liquids and solids of claim 1 wherein the removable and portable reservoir tank includes an exit port for draining the contents of the removable and portable reservoir tank, the removable and portable reservoir tank further including a cap to seal the exit port.

8. The trash receptacle for separating liquids and solids of claim 1 wherein the removable and portable reservoir tank includes a drain channel to direct any excess liquid from the connecting tube to the chute area.

9. The trash receptacle for separating liquids and solids of claim 1 wherein the shape of the trash receptacle is one of: generally rectangular and generally circular or oval.

10. The trash receptacle for separating liquids and solids of claim 1 wherein the lid unit and the removable and portable reservoir tank are fabricated from a plastic material.

11. A method comprising:

assembling a lid unit including a sink area for receiving waste liquids and a chute area for receiving waste solids;

assembling a removable and portable reservoir tank for retaining the waste liquids, the sink area including a connecting tube coupling the sink area to the removable and portable reservoir tank and enabling the waste liquids to flow from the sink area into the removable and portable reservoir tank;

mounting the assembled removable and portable reservoir tank on an opening of a trash container; and mounting the assembled lid unit on the removable and portable reservoir tank.

12. The method of claim 11 wherein the sink area and the chute area of the lid unit are integrated into a single component.

13. The method of claim 11 including attaching a stainless-steel grate to the sink area to strain off any large items that may be placed in the sink area.

14. The method of claim 11 including connecting a drain of the sink area to the connecting tube for disposal of liquids into the removable and portable reservoir tank.

15. The method of claim 11 including providing a check valve configured to be open when the lid unit is coupled to the removable and portable reservoir tank, the check valve being configured to be closed when the lid unit is detached from the removable and portable reservoir tank.

16. The method of claim 11 including providing an exit port on the removable and portable reservoir tank for draining the contents of the removable and portable reservoir tank.

17. The method of claim 11 including providing an exit port on the removable and portable reservoir tank for draining the contents of the removable and portable reservoir tank, and providing a cap to seal the exit port.

18. The method of claim 11 including providing a drain channel on the removable and portable reservoir tank to direct any excess liquid from the connecting tube to the chute area.

19. The method of claim 11 wherein the shape of the trash receptacle is one of: generally rectangular and generally circular or oval.

20. The method of claim 11 including fabricating the lid unit and the removable and portable reservoir tank from a plastic material.

* * * * *